United States Patent
Atzmony et al.

(10) Patent No.: US 7,395,283 B1
(45) Date of Patent: *Jul. 1, 2008

(54) METHOD AND APPARATUS FOR MAKING INDEPENDENT DATA COPIES IN A DATA PROCESSING SYSTEM

(75) Inventors: Yedidia Atzmony, Newton, MA (US); Haim Kopylovitz, Newton, MA (US); David I. Levinson, Framingham, MA (US); Hana Moreshet, Framingham, MA (US); DeAnn L. O'Hare, Hopkinton, MA (US); Philip E. Tamer, Westborough, MA (US)

(73) Assignee: EMC Corporation, Hopkinton, MA (US)

( * ) Notice: Subject to any disclaimer, the term of this patent is extended or adjusted under 35 U.S.C. 154(b) by 393 days.

This patent is subject to a terminal disclaimer.

(21) Appl. No.: 10/705,772

(22) Filed: Nov. 10, 2003

(51) Int. Cl.
*G06F 7/00* (2006.01)
*G06F 17/00* (2006.01)

(52) U.S. Cl. ............ 707/204; 707/201; 707/202; 707/10

(58) Field of Classification Search ........... 707/204, 707/201, 202, 10
See application file for complete search history.

(56) References Cited

U.S. PATENT DOCUMENTS

| | | | | |
|---|---|---|---|---|
| 6,101,497 | A | 8/2000 | Ofek | 707/10 |
| 6,363,385 | B1 * | 3/2002 | Kedem et al. | 707/10 |
| 6,546,457 | B1 * | 4/2003 | Don et al. | 711/114 |
| 6,718,437 | B2 * | 4/2004 | Don et al. | 711/114 |
| 6,757,797 | B1 * | 6/2004 | Kaiya et al. | 711/162 |
| 7,031,966 | B2 * | 4/2006 | Kedem et al. | 707/10 |
| 7,039,659 | B2 * | 5/2006 | LeCrone et al. | 707/203 |
| 7,099,875 | B2 * | 8/2006 | Kedem et al. | 707/10 |

* cited by examiner

*Primary Examiner*—John Cottingham
*Assistant Examiner*—Kimberly Lovel
(74) *Attorney, Agent, or Firm*—George A. Herbster

(57) ABSTRACT

A method for copying data from a source logical device to a destination logical device. In response to a copy command from a requesting host application identifying the source and destination logical devices, an environment is established. Thereafter a calling system receives an immediate response that the copy operation is complete even though no data has been copied. Application programs may access storage locations in either the source or the destination logical device during the copy phase. A copy program transfers the date on a track-by-track basis to the destination logical device. Procedures assure that any data access to a particular track in either the source or destination logical device by any application prior to the transfer of that track is accommodated to maintain data integrity.

16 Claims, 12 Drawing Sheets

METHOD AND APPARATUS FOR MAKING INDEPENDENT DATA COPIES IN A DATA PROCESSING SYSTEM

BACKGROUND OF THE INVENTION

1. Field of the Invention

This invention generally relates to data storage in data processing systems and more particularly to a method for copying data from one storage device to another storage device in an open system.

2. Description of Related Art

Copying data from one location, commonly a "source location" to a second or "destination location" is well known in the art. In some situations copying provides data redundancy. In other situations providing two or more copies enables a like number of independent applications or procedures to process the copied data independently.

In one conventional approach, as particularly well known in the use of personal computers, copying is performed on a file-by-file basis between different logical volumes or between different directories on the same logical volume. The conventional device utilizes a "copy" command that specifies a path to a source and file to be copied and a path to a destination location. The processor then copies the data from the source to the destination location. During the copy process no application can access the data at either the source location or the destination location.

In other systems involving larger and more sophisticated data storage facilities, applications may operate on multiple host processors. Such facilities often have the capability of performing copying independently of other host applications. That is, while data is being copied from a source to a destination, other programs or processes can operate on data in locations other than the source or destination file locations. However, in these systems any access to the source file or the destination file is precluded until such time the copy has been completed.

Data processing systems have evolved into two arbitrary classes, namely: "mainframe systems" and "open systems". Generally speaking "mainframe systems" refer to larger IBM and IBM-like data processing systems with a powerful set of internal input-output commands that use CKD (Count-Key-Data) data formatting. "Open systems" refer to other data processing systems that operate with different internal input-output commands and different internal protocols and an FBA (Fixed Block Architecture).

Initially large capacity data storage devices were configured for operation with mainframe systems because at the time they were the only systems that had the power and storage capacity to handle large data sets. These systems also provided a track level of control. These systems have several ways to copy data from one location to another. For example, U.S. Pat. No. 6,101,497 discloses a process for obtaining a single copy of data by logical volume essentially independently of normal processing. However, this process requires a specially configured logical storage device called a BCV device.

U.S. Pat. No. 6,363,385 (2002) to Kedem et al. discloses a method and apparatus for making independent data copies in a mainframe data processing system. Specifically, this patent discloses a method for copying a data file from a source device to a destination device in response to a copy command that can identify noncontiguous blocks of contiguous tracks. An extents track is formed to establish an environment to which the data will be copied. A calling system receives an immediate response that the copy operation is complete even though no data has been copied. Application programs may access the file in either the source or destination. The copy program transfers the file on a track-by-track basis to the destination locations in accordance with the information in the extents track. Procedures to assure that any data access to a particular track in either the source or destination by any application prior to the transfer of that track are accommodated to maintain data integrity.

More recently, however, open systems have become popular particularly with advances in networking and hardware capabilities. Open systems generally make copies on a file-by-file basis where one logical volume is involved. However, they do not have commands with the capability of handling data on a track-by-track basis. In recent times, the need for making single or multiple copies essentially independently of normal processing has become more desirable even in open systems. Moreover, it has become desirable to transfer entire logical volumes, and even to copy a subset, because in open systems logical volume transfers can actually occur more quickly. This feature exists because it is not necessary to incur the overhead of finding data blocks associated with a single file which can be at any arbitrary position in a logical volume.

It was found that the overhead involved with the method described in U.S. Pat. No. 6,363,385 introduced unacceptable delays in the process. Moreover data in an open system logical volume is at any arbitrary location within a system. Thus is there no way to identify the extent of the data to be copied other than at a logical volume level. What is therefore needed is a method adapted for both mainframe systems and open systems for copying data from a source to a destination independently essentially of any processor operation with a minimal delay between the processing of a copy command initiating a copy process and the availability of both the source and destination locations for processing by different applications.

SUMMARY

Therefore it is an object of this invention to provide an improved method for copying data from a source to a destination in a data storage facility that is useful in open systems.

Another object of this invention is to provide an improved method of copying data from a source location to a destination location that occurs essentially independently of any host processes in open systems.

Still another object of this invention is to provide an improved method of copying data from a source to a destination with a minimum interruption to the interaction of processes operating on the source locations and the initiation of operations with the destination locations in open systems.

In accordance with one aspect of this invention a data processing system for connection in an open system network includes a host device for generating commands during the processing of a host application. One command initiates a copy of data from a source logical storage device to a destination logical storage device. The method first establishes an operating environment by identifying, in response to arguments in the command, the source storage device location and an initial destination storage location. After the operating environment is established, both the source and destination logical storage devices become available for use by host applications. Copying of the data from the source logical storage device to the destination logical storage device occurs in an ordered manner. For each storage location in the source logical storage device, data is copied from one location in the source logical storage device to the destination logical storage device. Information in the operating environment is then updated to indicate the completion of the transfer.

In accordance with another aspect of this invention a data processing system for connection in an open system network includes a host device for generating commands during the processing of a host application. A host application can issue a command to copy data in a source logical storage device comprising a plurality of contiguous data tracks to a block of contiguous data tracks in a destination logical storage device. The copying initially involves establishing an operating environment by identifying, in response to arguments in the command, the source logical storage device and destination logical storage device. Then the data in the source and destination logical storage devices are made available for use by other host applications. Copying the data from the source logical storage device to the destination logical storage device occurs in an ordered, track-by-track basis. For each data track in the source logical storage device, data in the data track is copied to a corresponding data track in the destination logical storage device. In addition, information in the operating environment is updated to indicate the completion of each transfer from a data track in the source logical storage device.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENTS

Before describing this invention in detail, it will be helpful to define certain terms. This invention is described in terms of an implementation in a direct access storage device (DASD) that includes multiple physical disk drives. Each disk drive comprises a plurality of tracks. From a user's standpoint, these data tracks are grouped into logical volumes that may include any quantity of data that would occupy a few tracks of a single physical disk drive to contiguous tracks across multiple physical disk drives. Logical volumes are also known as "logical disk storage volumes", "logical storage volumes" and "logical devices". The following discussion uses "logical devices". Logical devices are identified by logical device numbers, logical device names and by other conventions. In a copy operation data will be copied from one logical device to the other. In the following discussion a "source logical device" is the logical device from which the data is copied; a "destination logical device" is the logical device to which the data is transferred.

Figure 1:
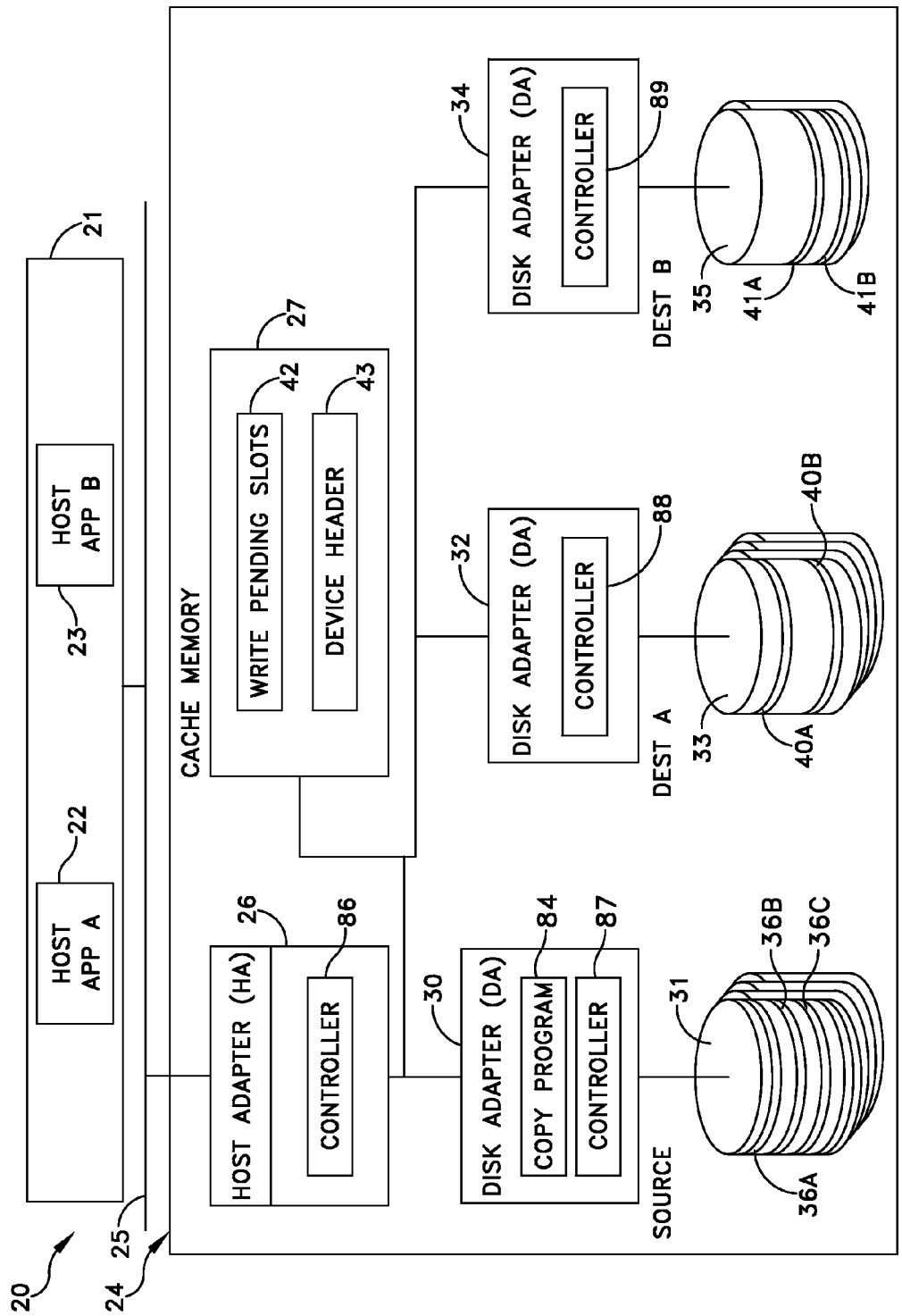
FIG. 1 is a block diagram of a data processing system, including a data storage facility, adapted for implementing this invention in an open system.

FIG. 1 depicts a data processing system 20 of the open system type in which a host array 21 with one or more host devices controls operations. Each host device processes a program and in the following discussion "host application" means a particular application program, procedure, process, module or the like being processed on a host. FIG. 1 depicts two such applications, namely: a HOST APP A application 22 and a HOST APP B application 23.

Each host application accesses and processes data stored in a data storage facility 24 over a system bus 25 that can take any of several known forms including single and parallel bus structures. For purposes of this explanation the data storage facility 24 can be considered to store all the data that will be processed either by HOST APP A application 22 or HOST APP B application 23.

This invention can be implemented in a number of disk storage facilities of different types and configurations. The following description is made in the context of a specific data storage facility 24, namely a Symmetrix disk array storage device (DASD). However, the adaptation of the specifically described embodiments for implementing the invention with other data storage devices will be readily apparent to persons of ordinary skill in the art.

A Symmetrix disk array storage device as a data storage facility 24 includes a host adapter 26 and a cache memory 27 that communicate with each other and with a series of disk adapters and physical disk drives. FIG. 1 depicts, for example, a first disk adapter (DA) 30 with an array of physical disks that store one or more logical volumes including a physical disk drive 31; a disk adapter 32 with a physical disk drive 33; and a disk adapter 34 with a physical disk drive 35. The configuration of data into logical volumes is entirely arbitrary. For purposes of explaining this invention it is assumed that a physical disk drive 31 includes at least logical devices 36A, 36B and 36C; physical disk drive 33, logical devices 40A and 40B; and physical disk drive 35, logical devices 41A and 41B.

Assume the HOST APP A application 22 processes data in the logical device 36A and, as a requesting host application, could then determine a need to transfer a copy of the data in logical device 36A to logical device 40A for use by another application, such as the HOST APP B application 23. Obviously the logical device 40A must have a capacity that is at least the capacity of logical device 36A. A special copy command (e.g., a FILE SMMF command) contains arguments that identify the logical devices 36A and 40A as source and destination logical devices respectively. Both logical devices can be identified by any known conventional procedures.

In response to the command, the requesting host application and the host adapter 26 interact to establish an operating environment by, among other things, storing the source and destination logical device locations for the transfer as will be described in greater detail with respect to FIG. 4. During the time required to establish the operating environment, individual data tracks in the DEST A logical device 40A may be locked for short intervals, but the data tracks in the source logical device 36A remain accessible.

As soon as the environment is established and a command is generated for producing the copy, the source logical device 36A and destination logical device 40A are enabled to communicate with any host applications. For example, the HOST APP A and HOST APP B applications 22 and 23 might be enabled to interact with the data in the logical device 36A and the copy in the logical device 40A.

Immediately after the environment is established, there is no valid data in the destination logical device 40A. However, and again as will be more clearly stated later, both the source and destination logical devices are available for use by host applications. A copy program proceeds in an orderly fashion, such as on a track-by-track basis, to copy the data from the source logical devices to the destination logical device. Any attempt to write data to the source logical device 36A or to read or write data from any copy in the destination logical device 33, produces a priority transfer of relevant data so that the data in the logical devices are maintained with integrity. After each transfer of a track, the information in the operating environment is updated.

Figure 2:
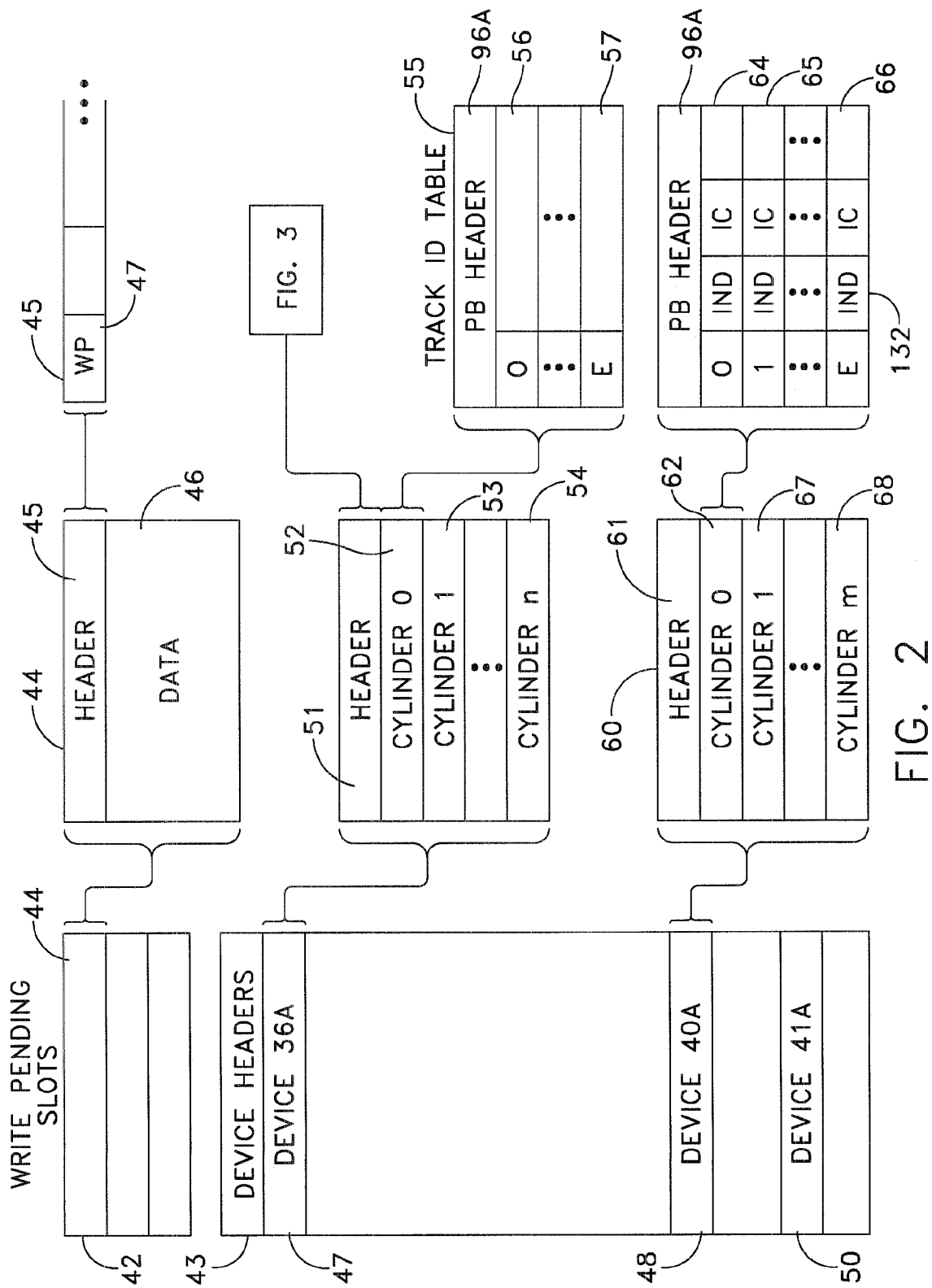
FIG. 2 is a more detailed description of a cache memory shown in FIG. 1 particularly configured for an open system.

FIG. 2 depicts in detail those portions of the cache memory 27 that are relevant to this invention, particularly with respect to write pending slots 42 and device headers 43. Use of data structures within a cache memory as write pending slots and device headers is generally well-known in the art. An individual write pending slot, such as a write pending slot 44, includes a header 45 followed by the data in a data block 46. Normally this data block will contain the data for one physical track. Each header 45 includes a WP flag 46 that indicates a need for write operations or destaging, of data from one of the write pending slots 42 to some location in a physical disk device. Once the data is transferred from the cache memory 27 to a corresponding data storage device, such as the source device 31, the system clears the WP bit 46 for that slot. Each header includes other information that is not relevant to this invention and, accordingly, is not shown.

The device headers 43 will include one entry for each logical device in the Symmetrix DASD. Three such entries are shown, namely: entry 47 for the logical device 36A; entry 48, for the logical device 40A; and entry 50, for the logical device 41A. Each of these entries has the same organization. That is, the device entry 47 includes a header 51 and a plurality of entries for each cylinder in the logical device 36A. Three specific entries are shown, namely: a Cylinder 0 entry 52, a Cylinder 1 entry 53 and a Cylinder n entry 54.

The header 51 has a structure that is described in further detail later. Each of the cylinder entries, such as Cylinder 0 entry 52, points to a block of locations that define a Track ID table 55 with each location being assigned to a particular track in the cylinder. Two track entries are shown in the Track ID table 55, namely: a Track $016$ entry 56 and a Track $E_{16}$ entry 57 for individual physical devices in which each cylinder comprises fifteen data tracks.

The logical device entry 48 comprises a block 60 that includes a header 61 and cylinder entries. FIG. 2 depicts three particular cylinder entries including a Cylinder 0 entry 62 that identifies a Track ID Table. The Track ID Table 55 includes, in this particular embodiment, three entries, namely: a Track 0 entry 64, a Track 1 entry 65 and a Track E entry 66. Additional cylinder entries in the block 60 will be included. FIG. 2 depicts two such entries, namely: a Cylinder 1 entry 67 and a Cylinder m entry 68. As will become apparent, n=m or n≠m. The device header entry 50 will have an analogous structure.

Figure 3:
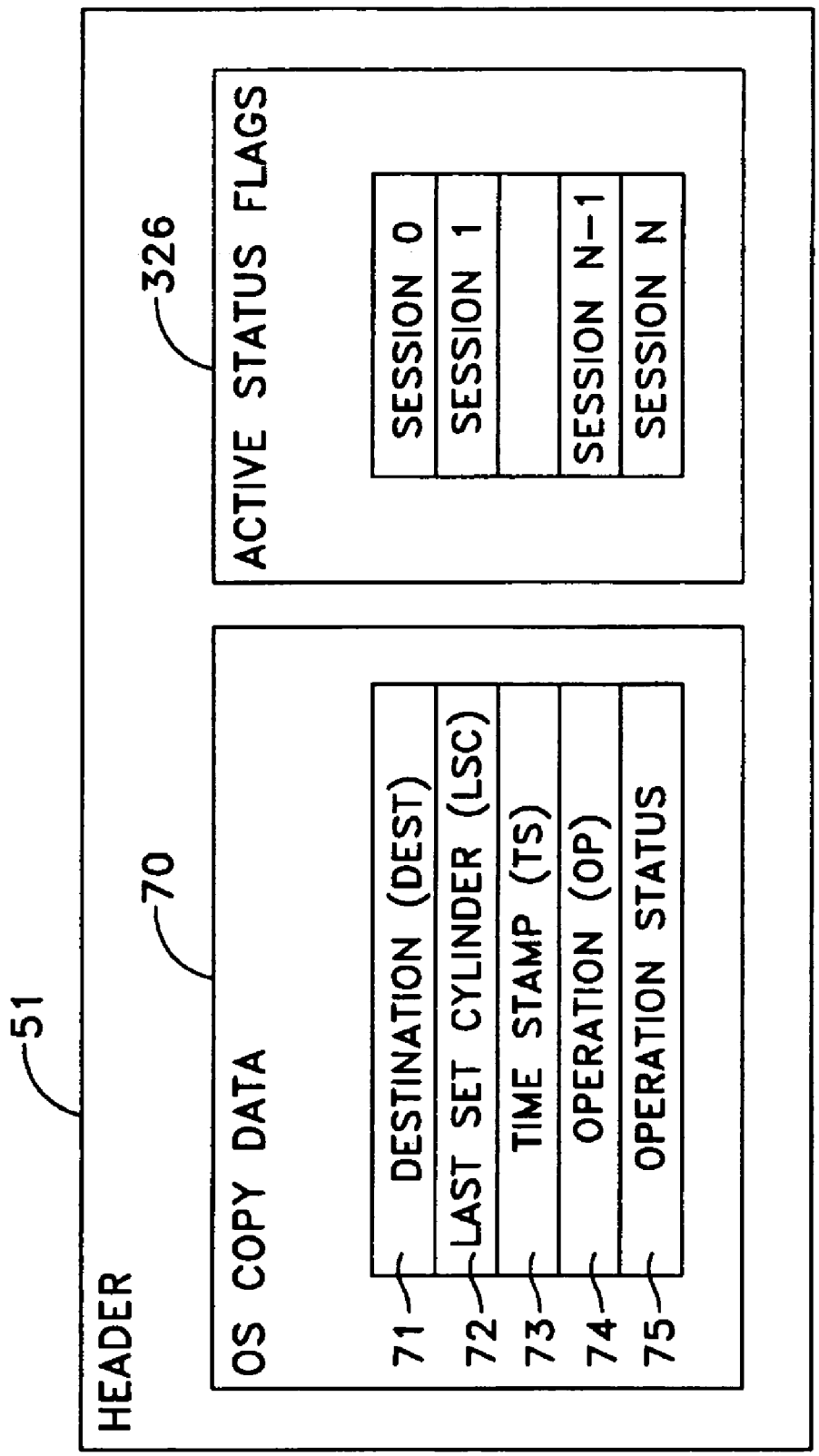
FIG. 3 is a still more detailed view of a data structure in the cache memory of FIG. 2 useful with open systems.

Still referring to FIG. 2 and as will be described later, a response to a copy command identifying the logical device 36A as the source device is to generate a data structure in the header block 51 of the source logical device entry 47. As shown in FIG. 3, the header block 51 will include an OS Copy data structure 70. The data structure 70 includes a DEST data element 71 that contains the initial destination address. An LSC data element 72 identifies the last set cylinder in the source device. That is, during the establishment phase, this data element is set to point to the last cylinder in the source disk storage device for which processing has begun. The initial value will be the location of the first cylinder to be transferred. A TS element 73 provides a time stamp that is useful particularly when large quantities of data are to be copied. An OP data element 74 identifies a particular operation that is occurring. In the context of the command operating phases, the OP data element would indicate whether the device is in the first, or "establish", phase, the second or "copy", phase or the third, or "modification/termination" phase. An OP STATUS data element 75 indicates the status of the operation; for example, whether the copy program is in progress, has been completed or has failed. Together the OP data element 74 and operating status disk element 75 define the state of the copy operation.

In the disclosed embodiment, a request, in either form, directs a copy program located in the disk adapter associated with the source device, such as the copy program 84 in the disk adapter 30 for the source logical device 36A, to begin a process by which data is copied from the source storage device to the destination storage device.

It can be considered that a File SMMF copy command for a mainframe system implementation produces operating phases as follows:

1. a first, or "establish", phase in response to a first command, provides an operating environment and begins when a requesting host application issues a "File SMMF" command and ends when a response is sent to the requesting host application indicating that the copy command has been processed. During this phase the requesting host application, the host adapter and source device adapter produce the data structure 70.
2. A second phase, or "copy" that begins when a second command that requests a copy operation is generated and ends when all the data has been copied. During this phase the copy program in the source logical device duplicates all the data on a track-by-track basis in the selected destination storage logical device. During this phase any attempt to access data on either the source or destination logical devices is handled in an expeditious manner.
3. A modification/termination phase during which the copy operation can be modified or terminated.

Referring to FIG. 1, each host adapter, such as host adapter 26 in the Symmetrix DASD data storage facility system 20 and each disk adapter, such as the disk adapters 30, 32 and 34, contains a controller such as a controller 86 in the host adapter 26, a controller 87 in the disk adapter 30, a controller 88 in the disk adapter 32 and a controller 89 in the disk adapter 34. Each such controller has a similar structure and comprises a microprocessor that will include its own random access memory and that has access to the cache memory 27.

Figure 4:
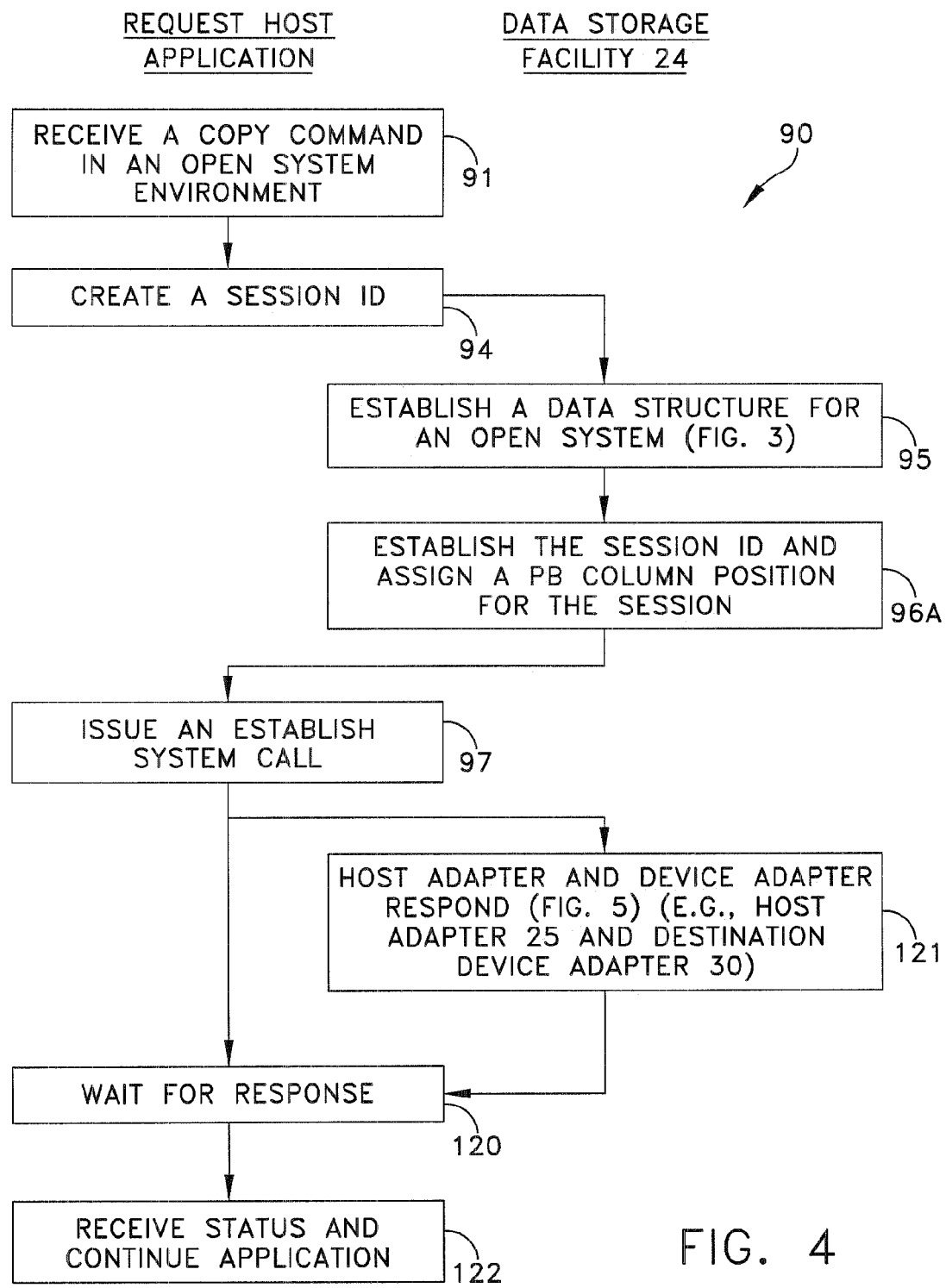
FIG. 4 depicts an interaction between a host array and data storage facility by which the copying occurs in an open system.
Figure 5:
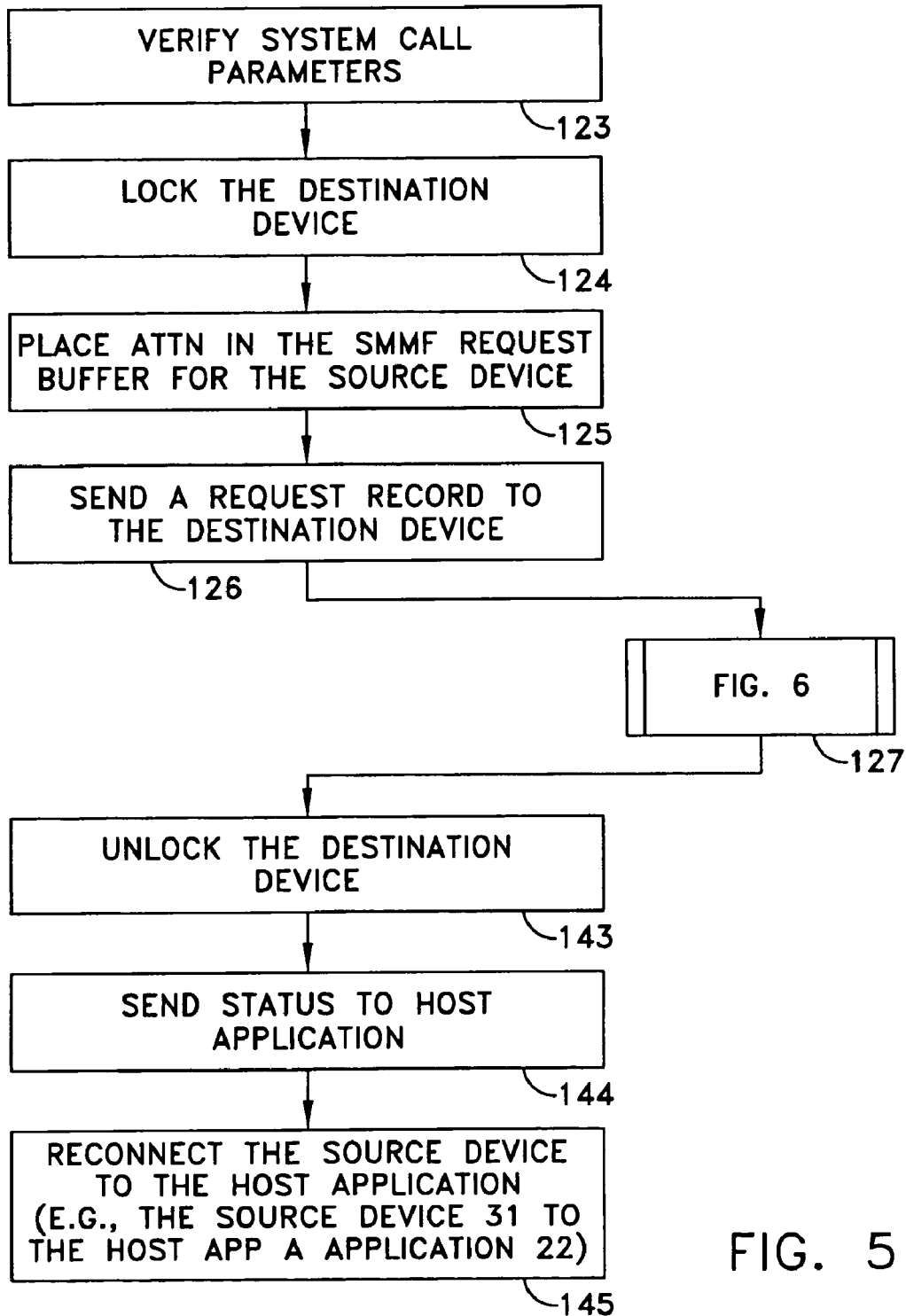
FIG. 5 is a more detailed flow diagram of a portion of the process depicted in FIG. 4.
Figure 6:
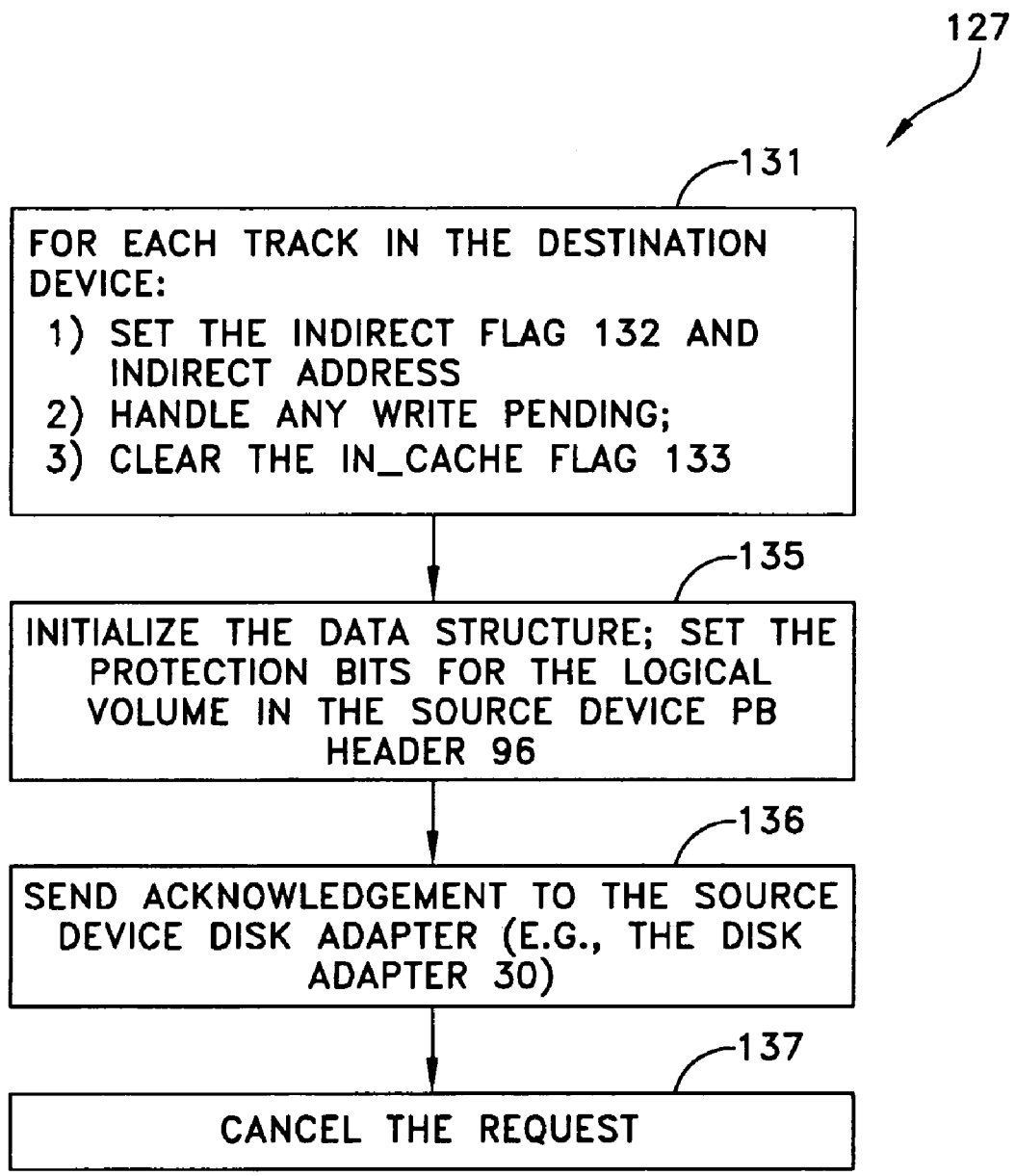
FIG. 6 is a more detailed flow diagram of a portion of the process depicted in FIG. 5.
Figure 7:
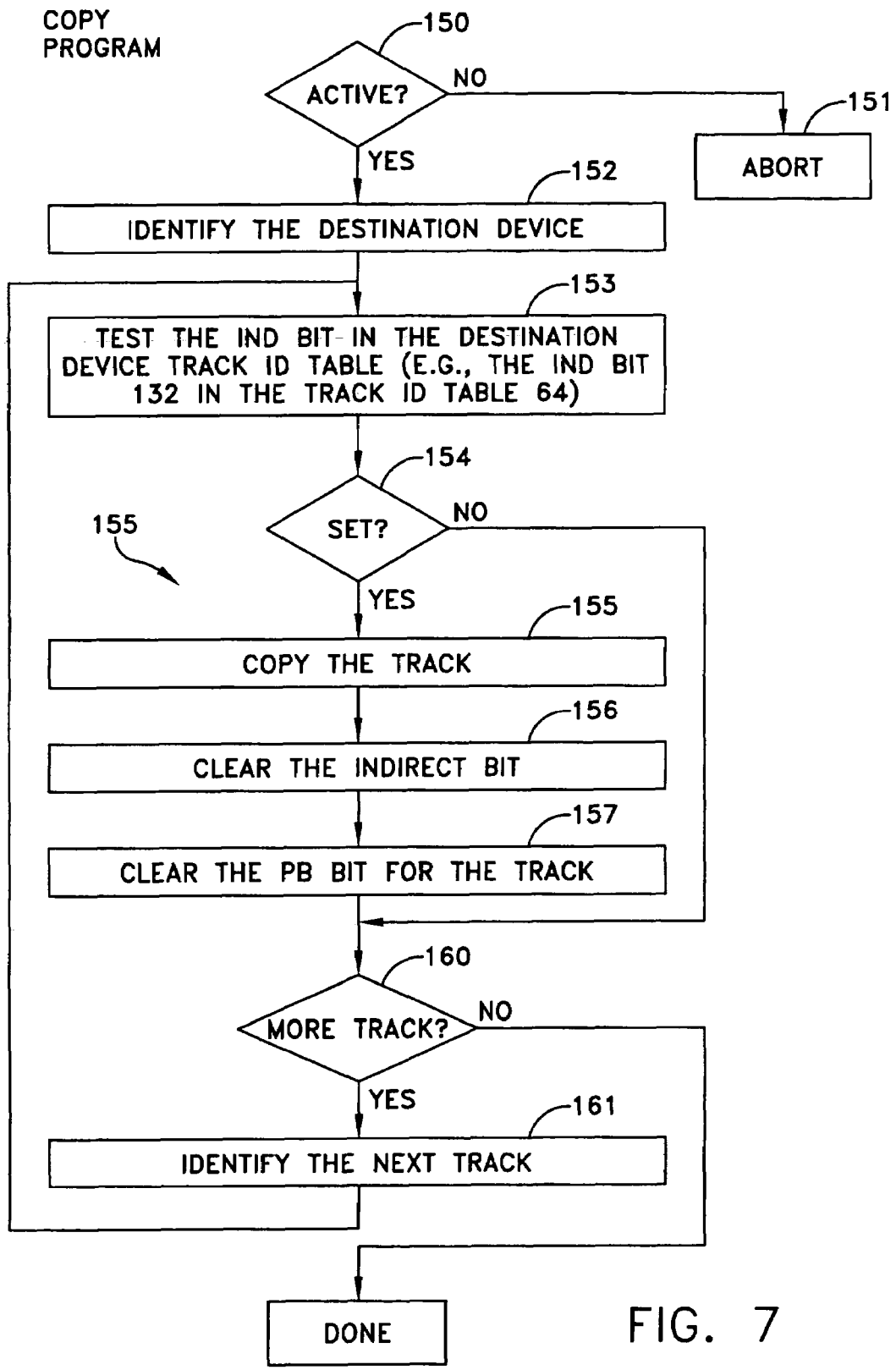
FIG. 7 depicts a copy program that is useful in accordance with this invention.
Figure 8:
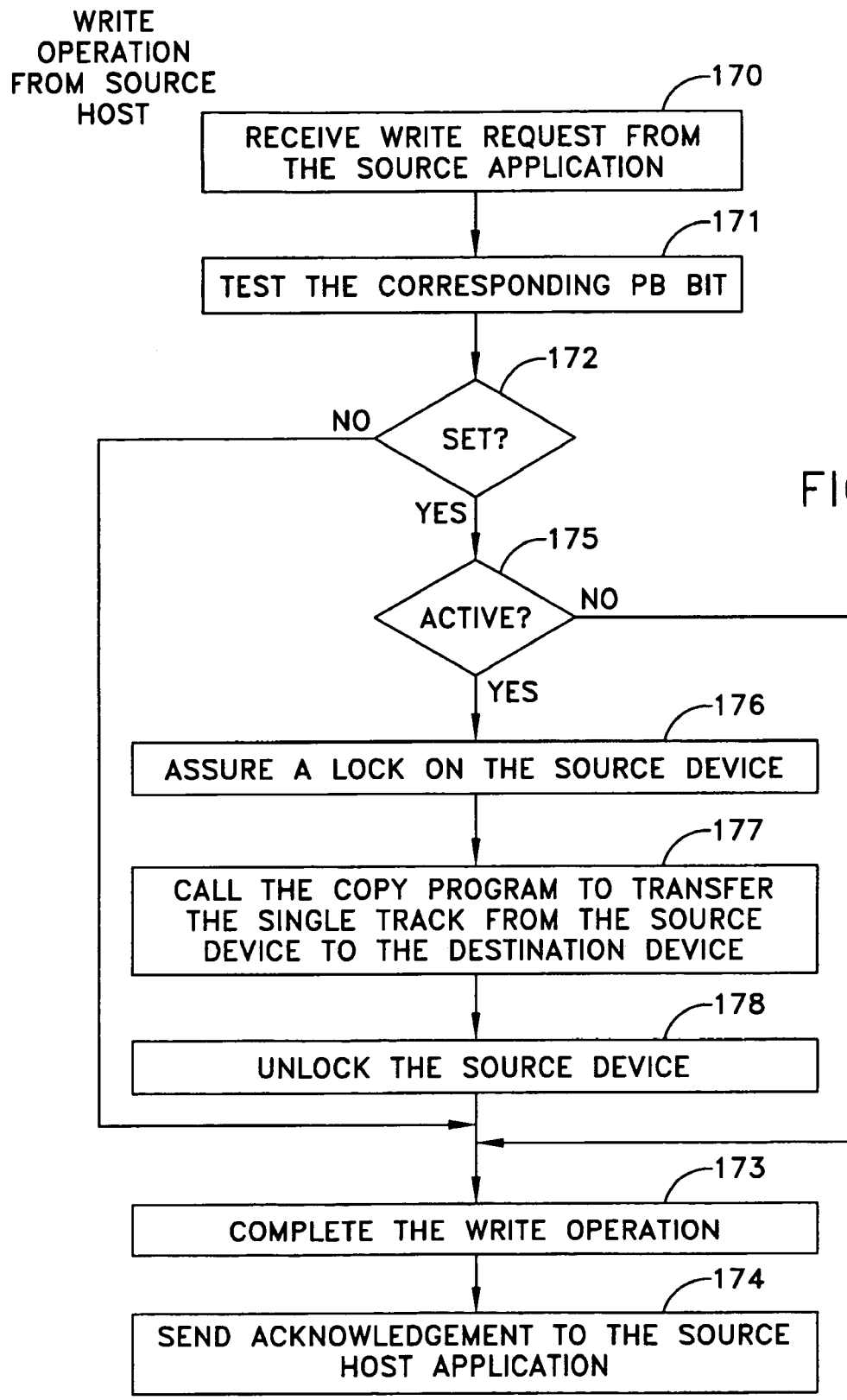
FIG. 8 depicts the response of the system to a write request to a predetermined source storage location.
Figure 9:
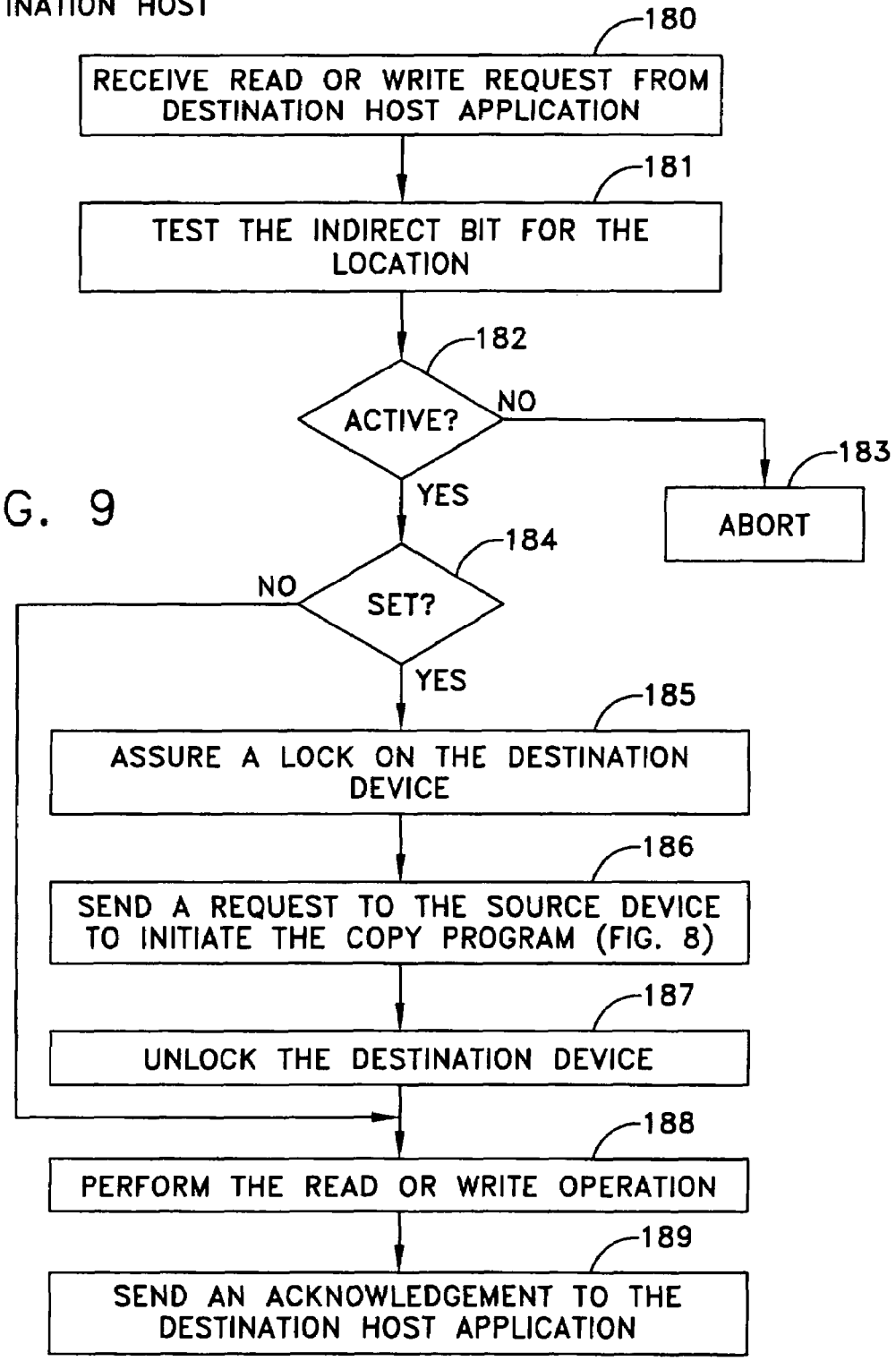
FIG. 9 depicts a response to read and write requests to a predetermined destination storage location.

FIGS. 4 through 6 disclose the steps and procedures conducted during the first, or establish operating phase; FIGS. 7 through 9, the second or "copy" operating phase; and FIG. 10, the third or "termination" operating phase.

When a requesting host application in an open system seeks to copy the data from the logical device 36A to the storage locations in logical device 40A, for example, the requesting host application initiates a process 90 including step 91 in FIG. 4 to interact with the data storage facility 24, particularly the host adapter controller and the device controller associated with the source, such as the controller 86 in the host adapter 26 and the controller 87 in the disk adapter 30 that is designated a source logical device. Step 94 begins a process for creating a session ID. Specifically, a host adapter controller, such as the controller 86 in the host adapter 26, transfers control to step 95 to establish and populate the data structure 70 of FIG. 3. Step 96 then establishes a session ID number. More specifically, there is associated with each Track ID Table a data block for containing protection bits. The data block can be considered as a two-dimensional array with one row for each track and one column for each session. In the Symmetrix disk array storage systems, each row is 2 bytes wide to define up to 16 sessions. This array is located as PB header 96A on each Track ID table. In the following discussion a particular PB bit position will be identified in the form PB(x,y) where x indicates a track in a cylinder and y indicates a session number. During the session creation in step 95, the controller 87 determines whether any "y" column is available. If one is available, the controller 87 establishes a session identification correlated to the selected PB bit column. This assignment is applied to each PB header 96 associated with the source and destination devices. Establishing separate sessions enables multiple copying operations to be processed in parallel even with overlapping areas. For example it is possible to copy the data from the logical volume 36A to the destination logical device 40A and to copy the data in logical device 36B to the destination logical device 41A by establishing a separate session.

After a session has been established and the PB column bit has been determined, control passes back to step 97 that issues an ESTABLISH system call as the first command to produce the operating environment. Then control at the requesting host transfers to step 121 to await a response (step 120) from the data storage facility 24.

The data storage facility 24, and particularly the destination device controller 88, responds to establish the environment and initiates the copy operation all as shown in FIG. 5. Once this process is completed, a status is returned to the requesting host application. Step 122 in FIG. 4 receives the status and enables the requesting host application to continue its operation, that may include generating a complete message or initiating the second, or "copy" operating phase.

When the host adapter in the data storage facility 24, such as the host adapter 26, receives an establish system call, the destination device controller, such as the controller 86, receives that system call and verifies various parameters in step 123 of FIG. 5. Such verification might include determining that the logical device identification is valid and the same address as might be recorded in the device header. Any of a number of other tests may also be performed to verify the context and content of the system call.

Assuming verification, control passes to step 124 wherein the host adapter locks the destination logical device, such as the destination logical device 40A. In step 125 the host adapter controller 86 places an ATTN signal in a request buffer for the source logical device, such as an ATTN flag in the header 51. Step 126 forms the request record for effecting the data transfer to the destination logical device. The request record includes the source logical device number and the destination logical device number.

Control then passes to a procedure 127 shown in FIG. 6. If the destination device has mirrored physical devices, a procedure, not described in detail, but known in the art, assures that all the related mirror devices are inactive. In an open system, control transfers to step 131. For each track in the destination device, step 131 performs a number of functions. First, it uses the values in the header 61 to determine that the header 61 is associated with a destination logical device and that an indirect (IND) bit position 132 in each track associated with the destination device is cleared. Then, for every destination track, step 131 sets that IND flag and sets an indirect address, that is the address of the track in the source logical device to be copied, to a cache pointer. If there are any pending write operations to the device, they are cleared. More specifically, this implementation of the invention assumes that the requesting host application will take no action to destroy data integrity. With this assumption, any write pending operations are irrelevant because they would be replaced by the copied file. Clearing the write pending flag assures that no such data will overwrite the copied file track. Any in-cache (IC) flag 133 that is set in each destination track is cleared.

Once all this information has been transferred to the track ID tables associated with the destination logical device, control transfers to step 135 to initialize the data structure 70 in FIG. 3 and to set the protection bits in the session column for each track in the source logical device. In step 136 the destination device controller 88 sends an acknowledgement to the disk adapter 30 associated with the source logical device 36A. Step 137 cancels the request generated in step 126 of FIG. 5.

Control then passes back to step 143 in FIG. 5 that unlocks the destination device. The host adapter controller 86 then sends status to the host in step 144 and reconnects the source logical device to the host application, such as the source logical device 36A to the HOST A APP application 22.

As will now be apparent, the steps of FIGS. 5 and 6 do not produce the physical transfer of any data. However, these procedures establish the operating environment for the copying operation by identifying source and destination logical devices to be involved in the copying operation. Nevertheless, when a destination logical device is unlocked in step 143 and a source logical device is reconnected in step 145, any host application can alter the file in the source logical device 31 and any other application can access data in the destination logical device 40A.

FIG. 7 depicts the procedures used by a copy program in the source logical device, such as the copy program 84 in the disk adapter 30 when the logical device 31 is the source logical device. Step 150 determines whether the session is "active", as will be described later. If it is not, step 151 aborts the operation of the copy program. Otherwise, step 152 uses the operating environment for the session to identify the destination logical device.

Steps 150 and 151 are introduced to the copy program to control the beginning of the "copy" operating phase independently of the completion of the "establish" phase. This can minimize the use of resources in preparing for a copy program especially when the logical volume is very large.

Step 153 is the first step in a loop that tests the IND flag for each track for the defined extent in the destination device, such as the IND flags 132 in the Track ID Table 64 in FIG. 2. This test determines whether it is necessary to copy a specific track from the source to the destination. As will become apparent later in this description, it is possible for other activity to have effected a transfer of an individual track. If the data in the track has not been transferred from the source device to a destination device, step 154 transfers control to step 155 that copies that track, such as from a track in the source logical device 36A to a corresponding or predetermined track in the destination logical device 40A. As known, this step 155 also handles any write pendings that may exist at the time of the track transfer. Step 156 clears the IND bit 132 in the destination device and step 157 clears the corresponding PB bit in the header 96 for the track in the source device 31.

Clearing the IND flag assures that an application processing that track in the destination logical device will not try to copy the track; clearing the PB bit in the source device assures that the track will not be copied if a host application accesses that track in the source device 31. If there are additional tracks to be processed in step 160 control passes to step 161 to identify a next track and the control returns to step 153.

If step 154 determines that the IND bit is not set, no copying occurs and control passes directly to step 160. When all the tracks have been identified in sequence, it is considered that the extent has been transferred and the copy program terminates.

As previously indicated, the second operating phase insures data integrity during the copying process even though a host application can access the source logical device 36A or the destination logical device 40A before data is actually copied.

FIG. 8 depicts the response to a write request from an application, such as occurs when the HOST APP A application 22 attempts to write data to the source logical device 36A. Read requests are processed in a conventional form as they do not alter the data. For a write request, however, the host adapter 26 passes the write request to the source disk adapter, such as the source disk adapter 30 for a write to the source logical device 36A. The controller 87 receives that request in step 170 and tests the corresponding PB bit associated with the source device in step 171, such as the PB bit in the corresponding header 96A of the source Track ID Table 55. The PB bits in a given column collectively correspond to all the tracks in the device. However, the set bits in a column will identify those files, or other data subsets, that are to be copied. Thus, the PB(s) bit positions constitute, as part of the operating environment, a list of the predetermined source storage locations in the source disk storage device. Similarly, the IND bit positions in the destination device Track ID Table provide a list of the predetermined destination storage locations in the destination device.

During a normal operation, if a PB bit in the source device Track ID Table, such as the Track ID Table 55 in FIG. 2, is cleared, the track is either not in the extent or already has been transferred. If the PB bit is cleared or the session is not active, no copying is required. Step 172 diverts to step 173 to complete the write operation in a normal fashion. Step 174 then sends an acknowledgement to the host application that issued the write request, such as the HOST APP A application 22 in FIG. 1.

If the PB bit for a track is set, the track is included in the source logical device and still needs to be transferred, so step 172 transfers control to step 175. Step 175 determines if the session is active. The control of the active state is described later. Assuming the session is active, step 176 assures that there is a lock on the track in the source logical device and uses step 177 to call the copy program of FIG. 7 identifying the single track being written from the source host application. The copy program in FIG. 7 then responds by handling any write pending issues for that track by writing that single track from the source device to the destination device and by clearing the PB(s) bit in the Track ID tables for the source device and the corresponding IND for the destination device. When the copy program completes this one-track transfer, step 178 in FIG. 8 unlocks the source device so it is again immediately available to any application. Thus FIG. 8 depicts a process for insuring data integrity when a write request to the source logical device is received from a host application.

FIG. 9 depicts the operation that occurs when a host application, such as the HOST APP B application 23, seeks to access the destination logical device 40A. A controller for the destination logical device, such as the controller 88 in FIG. 1, receives read and write requests from the destination host application in step 180 of FIG. 9. Then the controller uses step 181 to access the corresponding destination logical device track ID table, such as the track ID table 64, to test the IND bit in the bit position 132. The IND bit position was set when the tracks in the destination logical device 40A were defined and the operating environment was established.

If the IND bit is set, it is necessary to immediately perform operations to assure that, in the case of a read request, the data is current or, in the case of a write request, the copy program operating in its normal mode does not overwrite new data. Step 182 assures that the session is active. Step 183 aborts the procedure if the session is not active. Assuming the session is active, control passes to step 184 that transfers control to step 185 when the IND bit is set. Step 185 assures a lock on the destination device. Step 186 then sends a request to the source logical device to initiate the copy program such as the copy program 84 in the source device disk adapter 30. When that single track has been copied, step 187 unlocks the destination device.

If the IND bit for a track is cleared, the track either is not in an extent or has already been copied. When the condition exists and the session is active, step 184 transfers control to step 188, bypassing steps 185, 186 and 187. Step 188 then performs the read or write operation and sends an acknowledgement to the destination host application in step 189.

Figure 10:
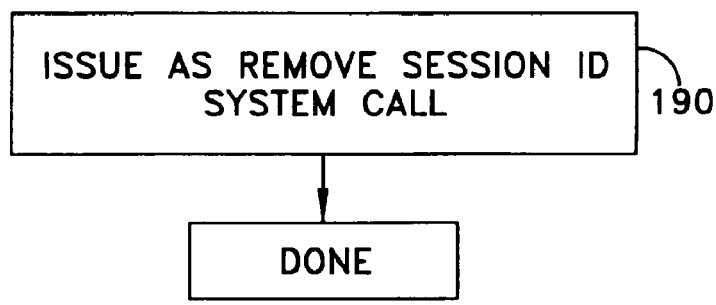
FIG. 10 is a flow diagram of a procedure for terminating a copy operation in an open system environment.

The termination/modification phase as shown in FIG. 10 for an open system merely requires step 190 to issue a remove session ID system call before completing operations. Although not shown in a figure, the remove session ID system call for a particular session clears all the PB bits from the column position assigned to the session for the source logical device and makes that PB column or session position available for other uses.

The foregoing discussion describes an operation by which data in a single source logical device is transferred to a single destination logical device 40A. As previously indicated, it is also possible to carry on multiple copy operations involving different source and destination logical volumes.

Thus it will now be apparent that this implementation of this invention for open systems provides an improved method for copying data from a source to a destination in a data storage facility. This copying occurs essentially independently of any host process. It also occurs with a minimum interruption to the interaction of the processes operating on the source locations and the initiation of operations with the destination locations.

Time Slice Processing

In FIG. 6 step 131 performs an operation whereby each indirect (IND) flag and each In_Cache flag is set to an initial value and any write pending operations involved for a track are handled for all the tracks to be involved in the transfer. In original implementations of this invention and in the prior art, this operation would process all tracks involved in the transfer without interruption. However, as databases and data storage requirements of logical volumes became larger in size, it was possible for step 131 to utilize significant resources for unacceptably long intervals at the expense of other operations. In accordance with one implementation of this invention two steps are taken to minimize the impact of the operation of step 131 and other steps during a copy operation. First, the "establish" and "copy" phases are separated and require two separate commands from the host application. Thus a basic command may have different arguments or argument values to control the specific process by which copying occurs. Second, time slice processing is used during the establish phase to process the data in scheduled tasks during a series of time intervals or slices to limit resource utilization.

Figure 11:
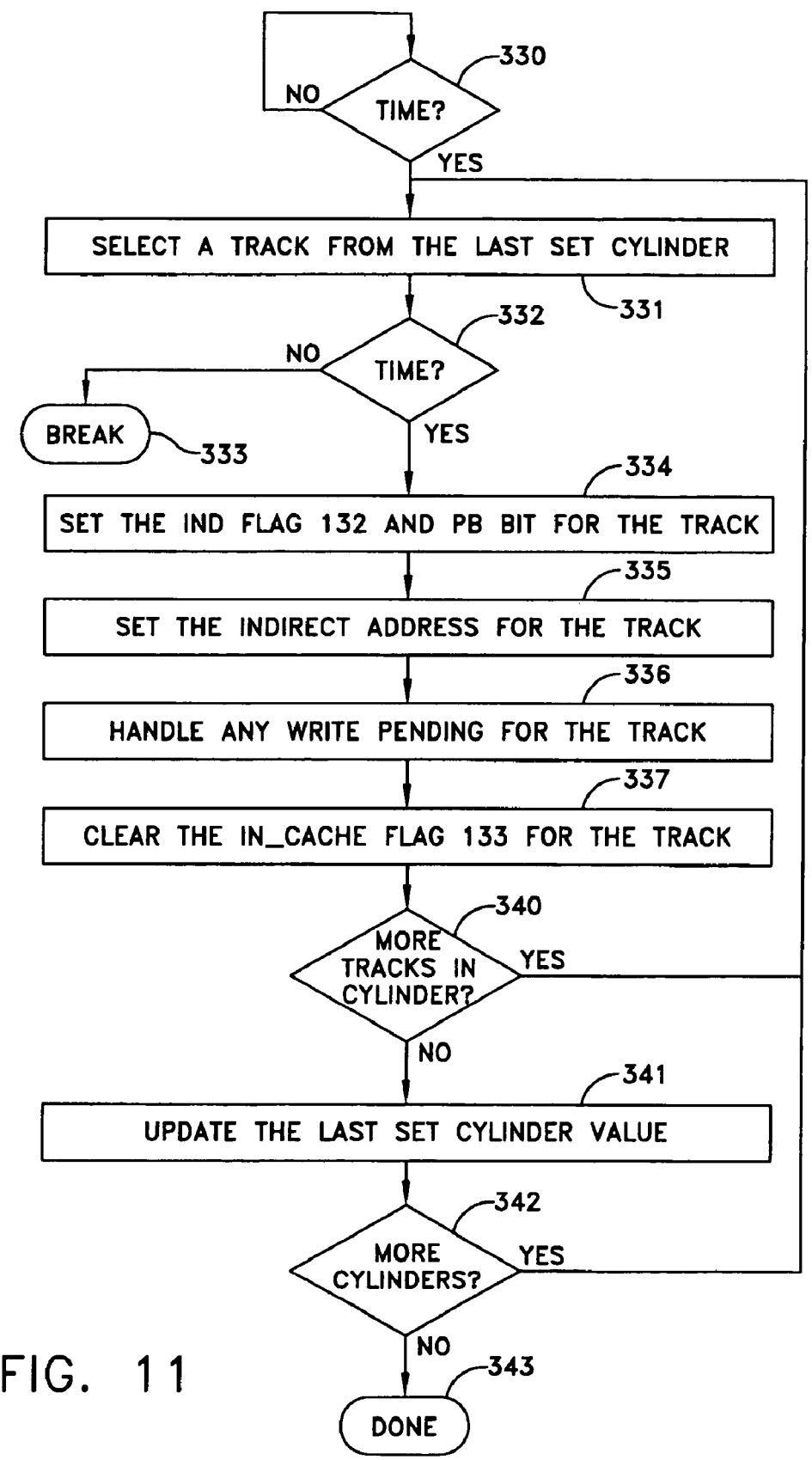
FIG. 11 depicts an alternative method for performing one function shown in FIG. 7.

FIG. 11 depicts the process by which such time slice processing occurs. Step 330 represents the process by which a task scheduler determines whether the time window or slice is open. If it is not, no further action occurs.

If the window is open, or slice is active, step 330 transfers control to step 331 to initiate the task in a repetitive or iterative fashion while the time slice is active. Step 331 uses the information in the LSC data element 72 shown in FIG. 3 to identify initially at the beginning of the window, a first cylinder to be processed. Step 331 selects a track in that cylinder, typically by identifying a read/write head. If the window has closed, control transfers to step 333 to perform a break operation but the cylinder and read/write head identifications are stored.

Initially the time window will still be open, so step 334 sets the IND flag 132 and PB bit for the track. Step 335 sets the indirect address for the track. Step 336 handles any write pending operations for the track. Step 337 clears the IN_CACHE flag 133 for the track. These are the same functions as shown in step 131. However, they only occur for one track during this iteration.

Step 340 then determines whether there are more tracks in the cylinder. If there are, control transfers back to step 331. So long as the window remains open these tasks will continue to be processed in an iterative fashion with each iteration processing one track. If the time window closes, control again transfers from step 332 to step 333 to break the operation. However, the LSC data element 73 in FIG. 13 contains the cylinder address and the selected track identification from step 331. Thus when the window again opens the operation begins at exactly the point at which it left off.

When all the tracks in a cylinder have been processed, step 340 transfers control to step 341 to update the LSC data element 72 to point to the next cylinder in the source disk storage device. When all the cylinders have been processed, step 342 terminates the operation. This may include sending a message back to the host application indicating that all the processing has been completed and that the copying programs can begin. This process may also include setting OP data element 74 to indicate an establish operation and setting the OP STATUS data element 75 to a "done" value. If more cylinders require a transfer, step 342 transfers control back to step 331 to select an initial read/write head and thereby define an initial track in the cylinder.

As will now be apparent, the use of the time slice methodology of FIG. 11 provides great flexibility to the system manager because the system manager can control the percent of resources available for the copy operation according to existing conditions in the data processing facility. Also this allows establishment of the environment so copying can begin at a precise point in time.

If the invention is implemented with a separation of the "establish" and "copy" phases, step 342 transfers control to step 343 that issues a message back to the host application. This message indicates completion of the "establish" phase. The application program thereafter can manually or automatically issue a command with arguments indicating that the "copy" phase should begin.

Figure 12:
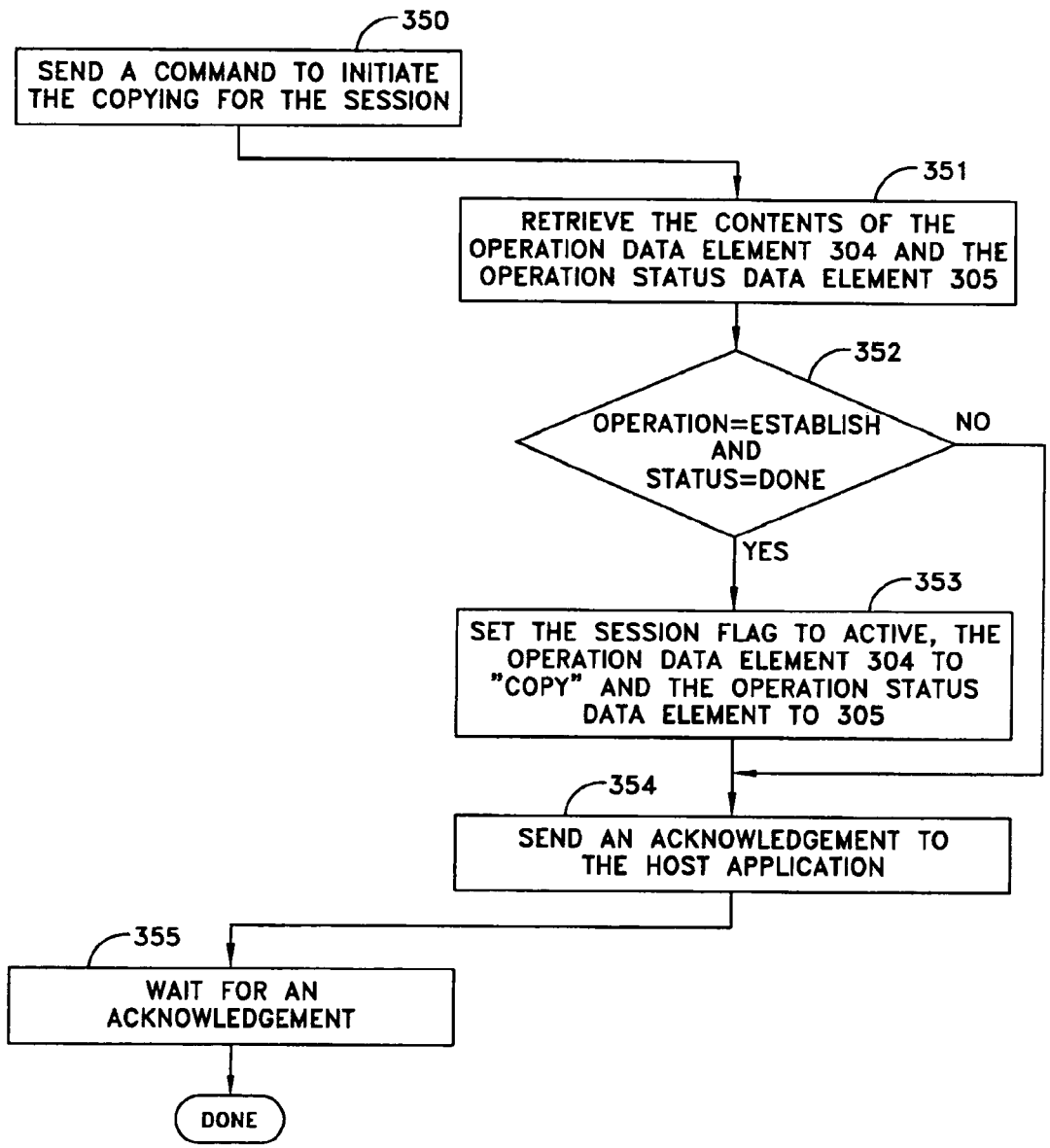
FIG. 12 depicts a method for enhancing the copying process of this invention in larger storage systems.

Step 350 in FIG. 12 represents this function. The data storage facility 24 responds to this second command by using step 351 to retrieve from the session data structure 70 the information in the OP data element 74 and the OP STATUS data element 75. These data elements should indicate that the "establish" phase is completed. If they do, step 352 transfers control to step 353 to set a session flag, such as one of the active session flags 326, to an active state. Step 353 also updates the session structure so that the OP data element 74 indicates that the operation has shifted to the "copy" phase. The OP STATUS data element 75 is updated to indicate that the "copy" phase is "in progress". Then step 354 sends an appropriate acknowledgement signal indicating success to the host application. Otherwise step 354 sends an acknowledgement signal indicating that process is terminated because the test in step 352 failed. In either case step 354 then sends an acknowledgement to the host application that processes the acknowledgement in step 355.

The impact of setting an active flag is shown in the copy program and request responses of FIGS. 7 through 9. Specifically if the active flag is not set, the copy program in FIG. 7 does not begin because step 150 transfers control to step 151 that aborts the copy program. When a write operation is occurring from the host as shown in FIG. 8, step 172 bypasses the sequence that calls the copy program in step 176. The new data is written to the source disk storage device. This is consistent with an approach whereby preprocessing occurs and, for a point-in-time backup, the point-in-time is the instant at which the call for the copying to begin occurs. In the case of a read or write operation from the destination host as shown in FIG. 9, step 182 aborts any read or write operation in step 183. In this situation if the session is not active, then writing data to the destination device may lead to inappropriate information. No data will be copied to the destination device for a read operation. Consequently no read or write operation will occur with the destination device until the copying program is actually operating.

These two features of time slice processing and operating phase separation taken collectively provide a system for copying data that has a minimum or controlled impact on other processor operations and allows the transfer to occur essentially concurrently with other operations.

This invention allows transfers to occur with minimal interruptions to other host applications. As described, the host application is merely dedicated for the purpose of establishing an operating environment for the transfer and steps, such as those shown in FIG. 11, can be used to minimize the impact. Once that environment has been established, a requesting host application is enabled to continue with other processes. It is not prevented from continuing while the actual transfer occurs.

As another advantage, this invention enables an application to request access to source logical devices or the destination logical devices even during the copying phase. The system provides means for processing the request to preserve data integrity.

The specific description of this invention has been in terms of one particular implementation with a specific data storage facility with disk data storage devices configuration. Specific flags such as IND flags, have been defined. FIGS. 4 through 12 disclose specific operating sequences. It is understood that the definition of these flags and operating sequences may be altered and others may be eliminated depending upon the configuration and capacities of a particular disk data storage facility with the attainment of some or all of the objectives of this invention. Moreover, the disclosed system is one example of a data handling system involving a host and a particular data storage facility. It will be apparent to those of ordinary skill in the art that the basic elements of this invention may be implemented in a wide variety of localized and network environments. Disk data storage devices are examples of storage devices with read and write capabilities. This invention may also be applied to storage devices with other read and write media. It might even be applied to a system in which the source storage device contained data in a read only media organized by addressable contiguous blocks. The foregoing and many other modifications can be made to the disclosed system without departing from the invention. Therefore, it is the intent of the appended claims to cover all such variations and modifications as come within the true spirit and scope of this invention.

What is claimed as new and desired to be secured by Letters Patent of the United States is:

1. A method for use with a data processing system for connection in an open system network including a data storage facility and a host device for generating commands during the processing of a host application including a first command with arguments identifying a source logical device and a destination logical device and a second command for initiating an ordered copying of data from the source logical device to the destination logical device wherein the data storage facility includes a host controller for receiving the commands, device controllers associated with each of said source and destination logical devices and means for interconnecting said device controllers, said method responding to the first and second commands by:

A) in response to the first command from the host device, establishing in the data storage facility an operating environment phase by generating a data structure including the addresses of the source and destination logical devices, an operation data element for identifying the operation of the establishment phase and an operation status element designating a status of said establishment phase and data identifying each storage location in the source and destination logical devices, and
   B) making the source and destination logical devices available for use by host applications,
   C) in response to the second command from the host, testing the operation data and status elements and, in response to values of said operation and status elements that indicate that the establishment phase has been completed, initiating an ordered copying of data from the source logical device to the destination logical device by:
      i) updating the operation data and status elements to indicate that copying is in progress and,
      ii) for each storage location in the source logical device:
         a) copying data from each storage location in the identified source logical device to the identified destination logical device, and
         b) updating the status for each storage device to indicate the completion of each transfer from a storage location, and
   D) upon completion of said copying, updating the operation status element to indicate that the copying has been completed.

2. A method as recited in claim 1 additionally comprising the step of deleting the operating environment after said copying has been completed for all the data in the source logical device and the operation element and status element indicate that the copying operation has been completed.

3. A method as recited in claim 2 wherein during said copying a host application generates as one command a write request to transfer data from the host application to an identified storage location in the source logical device, said method including the steps of:

i) interrupting said ordered copying in response to the request,
   ii) copying data existing in the identified storage location in the source logical device to a corresponding storage location in the destination logical device,
   iii) re-enabling said ordered copying upon completion of said data copying, and
   iv) completing the data transfer to the identified storage location in the source logical device in response to the write request.

4. A method as recited in claim 2 wherein during said copying a host application generates as one command one of read and write requests to transfer data between the host application and an identified storage location in the destination logical device, said method including the steps of:

i) interrupting said ordered copying in response to the request,
   ii) copying data to the identified storage location in the destination logical device from a corresponding storage location in the source logical device,
   iii) re-enabling said ordered copying upon completion of said data copying, and
   iv) completing the transfer between the host application and the identified storage location in the destination logical device.

5. A method for use with a data processing system for connection in an open system network including a data storage facility and a host device for generating commands during the processing of a host application including a first command to establish an operating environment for copying and a second command for initiating an ordered copying of the data from a source logical device comprising a plurality of contiguous data tracks on a physical disk storage device to a block of contiguous data tracks in a destination logical device wherein said source and logical device are components of the data storage facility that additionally includes a host controller for receiving the commands and a device controller associated with each of said source and destination logical devices, said method responding to the first and second commands by:

A) in the data storage facility and in response to the first command from the host device, establishing an operating environment by generating, in response to arguments in the first command, initial locations for the source and destination logical devices, an operation data element identifying an establishment phase and an operation status element designating a status of said establishment step as in process and data about each storage location in the source and destination logical devices
   B) making the data in the source and destination logical devices available for use by host applications,
   C) in response to the second command from the host device when the operation data and status elements indicate that the establishment has been completed, initiating an ordered copying of the data from the source logical device to the destination logical device on a track-by-track basis including for each data track in the source logical device, said ordered copying including:
      i) copying data from a data track in the source logical device to a corresponding data track in the destination logical device, and
      ii) updating the status for each storage device to indicate the completion of each transfer from a track in the source logical device, and D) upon completion of said copying, updating the operation data and status elements to indicate that the copying has been completed.

6. A method as recited in claim 5 additionally comprising the step of deleting the operating environment after said copying has been completed for all the data tracks in the source logical device and the operation element and status element indicate that the copying operation has been completed.

7. A method as recited in claim 6 wherein during said ordered copying a host application generates as another command a write request to transfer data to at least a portion of an identified data storage track in the source logical device, said method including the steps of:
   i) interrupting said ordered copying in response to the write request,
   ii) copying data existing in the identified data track in the source logical device to a corresponding track in the destination logical device,
   iii) re-enabling said ordered copying upon completion of said data copying, and
   iv) completing the transfer of data associated with the write request to the identified data track in the source logical device.

8. A method as recited in claim 6 wherein during said ordered copying a host application generates as one command one of read and write requests to transfer data between the host application and at least a portion of an identified track in the destination logical device, said method including the steps of:
   i) interrupting said ordered copying in response to the request,
   ii) copying data to the identified data track in the destination storage location from a corresponding data track in the source logical device,
   iii) re-enabling said ordered copying upon completion of said data copying, and
   iv) completing the transfer between the host application and the identified data track in the destination logical device.

9. A data storage facility that connects to a host device in an open system network that generates commands during the processing of host applications wherein said data storage facility is adapted for copying data from a source logical device to a destination logical device in response to a predetermined first and second commands from a host application identifying said source and destination logical devices and wherein said data storage facility includes a host controller for receiving the commands and a device controller for each logical device, said facility comprising:
   A) means responsive to the first predetermined command for establishing an operating environment phase by identifying said source and destination logical devices, said means including a copy data structure that identifies the source and destination devices and operation status data elements that collectively identify an operating phase and state thereof as an establishment phase in progress and means for indicating the status of the copying in each of the source and destination logical devices,
   B) means for enabling interaction of other commands with said source and destination logical devices, and
   C) copy means, responsive to the second predetermined command if said operation and operation status data elements indicate the establishment phase is complete, for initiating the copying of data from said source logical device to said destination logical device in an ordered manner and updating the operating phase to indicate that copying is in progress,
   D) means responsive to said copying means for updating the copying status to indicate data that has been transferred by said copying means, and
   E) means for updating the operating status to indicate the copying has been completed.

10. A data storage facility as recited in claim 9 additionally comprising means for deleting the operating environment after said copying means has been completed copying all the data in said source logical device and the operation element and status element indicate that the copying operation has been completed.

11. A data storage facility as recited in claim 10 wherein during the ordered copying a host application generates as another command a write request to transfer data from the host application to an identified storage location in said source logical device, said copying means including:
   i) a copy program,
   ii) means for operating said copy program in the ordered copying mode,
   iii) means for interrupting said ordered copying operating means in response to a write request and enabling said copy program to copy data from said identified storage location in said source logical device to a corresponding storage location in said destination logical device,
   iv) means for re-enabling said ordered copying upon completion of said data copying, and
   v) means for completing the data transfer to said identified storage location in said source logical device in response to the write request.

12. A data storage facility as recited in claim 10 wherein during said ordered copying a host application generates as one command one of read and write requests to transfer data between the host application and an identified location in said destination logical device, said ordered copying means including:
   i) a copy program,
   ii) means for operating said copy program in the ordered copying mode,
   iii) means for interrupting said ordered copying operating means in response to any read and write request to a storage location in said destination logical device to enable said copy program to copy data from a corresponding storage location in said source logical device to the identified storage location in the destination logical device,
   iv) means for re-enabling said ordered copying operating means upon completion of said data copying, and
   v) means for completing the transfer between the host application and said identified storage location in said destination logical device.

13. A data storage facility including logical storage devices, a first controller for receiving commands from a host and a device controller associated with each logical device, said data storage facility being adapted for connection in an open system network wherein the host device is adapted to generate a first command for establishing an operating environment for copying and a second command for initiating the copying of data, said first command including arguments identifying source and destination logical devices wherein each said logical device stores data in contiguous data tracks, said facility comprising:
   A) establishment means in the data storage facility responsive to the first command for establishing an operating environment by generating initial locations for said source and destination logical devices, an operation data element and operation status element that initially indicate an establishment phase in progress, and data about each data track in the source and destination logical devices, B) means for enabling interaction of other commands with said source and destination logical devices, and C) copying means for initiating, in response to the second command if the operation data and status elements indicate the establishment phase has been completed, an ordered copying the data from said source logical device to said destination logical device in a track-by-track, manner, D) updating means responsive to said copying means for updating the status about each data track during each transfer of data in a data track, and E) means responsive to the completion of the copying for updating the operating data and status elements to indicate the completed state of the copying.

14. A data storage facility as recited in claim 13 additionally comprising means for deleting the operating environment after said copying means has been completed copying all the data in said source logical device and the operation element and status element indicate that the copying operation has been completed.

15. A data storage facility as recited in claim 14 wherein during said ordered copying a host application generates as one command a write request to transfer data from the host application to an identified data track in said source logical device, said copying means including:

i) a copy program, ii) means for operating said copy program in the ordered, track-by-track manner, iii) means for interrupting said ordered copying operating means in response to the write request and enabling said copy program to copy data in said identified data track in said source logical device to a corresponding data track in said destination logical device, iv) means for re-enabling said ordered copying upon completion of said data copying, and v) means for completing the transfer of data associated with the write request to said identified data track in said source logical device.

16. A data storage facility as recited in claim 14 wherein during said ordered copying a host application generates as another command one of read and write requests to transfer data between the host application and an identified data track in said destination logical device, said ordered copying means including:

i) a copy program, ii) means for operating said copy program in the ordered, track-by-track, manner, iii) means for interrupting said ordered copying in response to one of the read and write requests to a data track in said destination logical device thereby to enable said copy program to copy the data in said corresponding data track of said source logical device to said identified data track in said destination logical device, iv) means for re-enabling said ordered copying upon completion of said data copying, and v) means for completing the transfer between the host application and said identified data track in said destination logical device, and vi) means for completing the transfer between the host application and the identified destination storage location.

* * * * *